Patented Aug. 24, 1937

2,091,242

UNITED STATES PATENT OFFICE 2,091,242

BENZANTHRONE ACRYLIC ACIDS

Ralph N. Lulek and Clarence F. Belcher, South Milwaukee, Wis., assignors to E. I. du Pont de Nemours & Company, Wilmington, Del., a corporation of Delaware No Drawing. Application November 23, 1936, Serial No. 112,351

4 Claims. (Cl. 260—61)

This invention relates to the preparation of new compounds of the benzanthrone series and more particularly to the manufacture of benzanthroneacrylic acids.

We have found that new benzanthroneacrylic acids which are valuable as intermediates for the preparation of dyestuffs can be prepared by reacting 2-benzanthronealdehyde or Bz1-benzanthronealdehyde with anhydrous sodium acetate in acetic anhydride or with malonic acid in the presence of pyridine or other basic organic solvents. These new acrylic acids of the benzanthrone series undergo the diene-condensation (see Annalen 460, pp. 98 et seq.) with methylene anthrone, or they may be converted to the acid chlorides and condensed with amino compounds of the anthraquinone series, to give new and valuable dyestuffs.

The 2-benzanthroneacrylic acid is of particular interest for use in preparing 2-Bz1-dibenzanthronyl, which, although it is an old compound, can be prepared from these new acrylic acids in higher yields and in more pure form than it has been obtained by known methods.

The following examples are given to more fully illustrate the preparation of these new compounds. The parts used are by weight.

Example 1

50 parts of 2-benzanthronealdehyde obtained according to the method of U. S. Patent 1,935,949 and 25 parts of anhydrous sodium acetate are stirred into 300 parts of acetic anhydride. The mass is stirred and heated at the reflux temperature for 1½ hours. The partially cooled reaction mixture is poured into about 2000 parts of water made slightly acid with hydrochloric acid, and the whole is stirred and heated until the crude 2-benzanthroneacrylic acid is well dispersed.

The product is collected by filtration and washed free from acid. It is slurried in warm water and the 2-benzanthroneacrylic acid extracted with dilute ammonia. The ammoniacal solution is acidified and the 2-benzanthroneacrylic acid obtained as a yellow precipitate.

It dissolves in concentrated sulfuric acid to a red solution without fluorescence.

Example 2

45 parts of 2-benzanthronealdehyde and 45 parts of malonic acid are dissolved and suspended in 178 parts of pyridine and 4 parts of piperidine. The mixture is warmed gradually to the reflux temperature whereupon a brown solution results. The charge is maintained at the reflux temperature for a period of 1 hour. Upon cooling, the 2-benzanthroneacrylic acid separates as yellow needles and is collected by filtration.

Example 3

25 parts of 2-benzanthronealdehyde and 25 part of malonic acid are added to 75 parts of pyridine and 25 parts of piperidine, and the whole is warmed at the reflux temperature for a period of 1 hour. When cool, the reaction mass is poured into a slight excess of cold dilute sulfuric acid. The whole is stirred and warmed to 60–70° C., filtered, and the residue washed free from acid with water. The residue is suspended in a warm dilute sodium carbonate solution and the 2-benzanthroneacrylic acid is obtained by filtration and acidification of the alkaline filtrate. It is identical with the product of Examples 1 and 2. It can be crystallized from organic solvents, and after one crystallization from nitrobenzene melts at 283–285° C. with decomposition.

Example 4

30.5 parts crude Bz1-benzanthronealdehyde obtained from Bz1-methylbenzanthrone (M. P. 163–164° C.) according to the method of U. S. Patent 1,935,949, 20.0 parts piperidine, 102.0 parts pyridine, and 30.5 parts malonic acid are warmed 1 hour at the reflux temperature. When cool, the charge is poured into an excess of cold dilute sulfuric acid and warmed to about 80° C. with good agitation. The crude product is filtered and washed free from acid. It is then reslurried in warm water containing about 1% $Na_2CO_3$. The alkali soluble portion is separated by filtration. Acidification of this filtrate yields Bz1-benzanthroneacrylic acid. The yellow compound, after one recrystallization from pyridine, melts at 296–297° C. and dissolves in concentrated sulfuric acid, giving a bluish red color with an orange fluorescence.

We claim:

1. A benzanthroneacrylic acid wherein the acrylic acid radical is attached to one of the free peri positions of the benzanthrone molecule.

2. 2-benzanthroneacrylic acid.

3. Bz1-benzanthroneacrylic acid.

4. The process for preparing benzanthroneacrylic acids which comprises reacting upon a benzanthronealdehyde in which the aldehyde group is present in one of the free peri positions of the benzanthrone molecule with a compound which is capable of reacting with an aldehyde to form an acrylic acid.

RALPH N. LULEK.
CLARENCE F. BELCHER.